Oct. 16, 1928.                         1,688,303
H. C. CARPENTER
FLEXIBLE ELECTRIC CONDUCTOR
Original Filed July 25, 1925
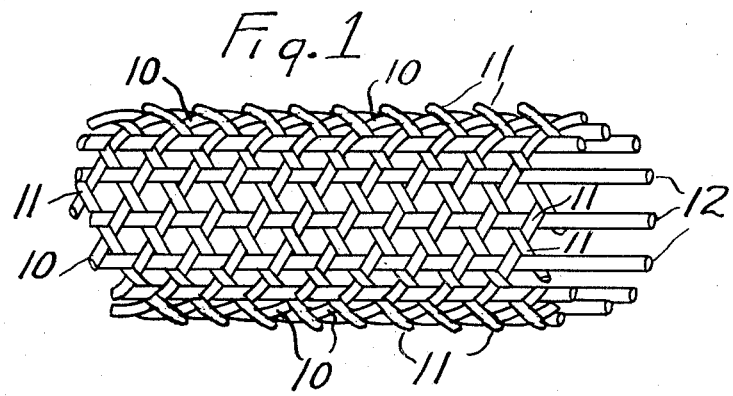
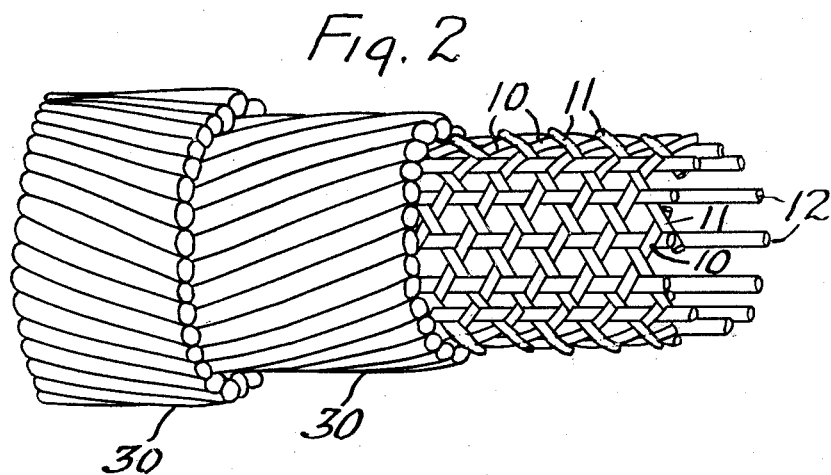
INVENTOR
Hamilton C. Carpenter
BY
Edw. VanWinkle
ATTORNEY Patented Oct. 16, 1928.

1,688,303

UNITED STATES PATENT OFFICE.

HAMILTON C. CARPENTER, OF ELIZABETH, NEW JERSEY, ASSIGNOR TO AMERICAN COPPER PRODUCTS CORPORATION, OF NEW YORK, N. Y., A CORPORATION OF DELAWARE.

FLEXIBLE ELECTRIC CONDUCTOR.

Application filed July 25, 1925, Serial No. 46,099. Renewed August 8, 1928.

My invention relates to electric conductor cables designed for use in the transmission of electrical power by means of high voltages.

It is well known by those skilled in the art that hollow core cables will transmit high voltages without the losses found to exist if the same cross section of cable is in solid form. Many hollow core cables of different constructions have been proposed, but they are costly and have not sufficient strength to withstand the mechanical strains of service. One of the objects of this invention is to provide a hollow core cable that is easily constructed and of such a weave that strengthening wires may be woven in the braid to overcome this objection of weakness. A further object of this invention is to provide a cable that will be flexible to facilitate handling, sufficiently strong to prevent transverse collapse, and of sufficient tensile strength to stand up in service.

The foregoing and other features of my invention will now be described in connection with the accompanying drawing forming part of this specification in which I have represented my hollow core cable in its preferred form after which I shall point out in the claims those features which I believe to be new and of my own invention. In the drawings, Figure 1 is an isometric view of my braided cable.

Figure 2 is a view similar to that shown in Figure 1, illustrating my method of increasing the cross section of the conducting material.

In the carrying out of my invention I provide a plurality of wires 10 that progress around the cable at an angle to its longitudinal axis and a second set of wires 11 that progress in an opposite direction around and entirely outside the first set of wires 10 at an angle to its longitudinal axis. A third set of longitudinal wires 12 are woven into the wires 10 and 11 by passing alternately over the wires 11 and under the wires 10. The wires 12 may be of high tensile strength while the wires 10 and 11 may be of high electrical conductivity.

In order to increase the conductivity of the cable beyond a reasonable size of wire used for the braided core and to cause the surface to be more or less continuous, I may provide one or more layers of stranded wire 30 around the braided core as illustrated in Figure 2.

I wish it distinctly understood that my hollow core cable herein described and illustrated is in the form in which I desire to construct it and that changes or variations may be made as may be desirable without departing from the salient features of my invention and I therefore intend the following claims to cover such modifications as naturally fall within the lines of invention.

I claim:

1. A hollow core cable comprising a plurality of wires that progress around the hollow core at an angle to the longitudinal axis, a plurality of wires that progress around the first mentioned wires and at a similar angle but in opposite direction thereto, a plurality of longitudinal wires woven into the cable by passing alternately under the first mentioned wires and over the second mentioned wires.

2. A hollow core cable, comprising two sets of wires, one set wrapped around the other with interlacing longitudinal wires passing alternately under the inner set and over the outer set.

3. A hollow core cable comprising a central hollow core consisting of two sets of stranded wires of high electrical conductivity, one set wrapped around the other with interlacing longitudinal wires of high tensile strength passing alternately under the inner set and over the outer set, the strands of wires of high electrical conductivity progressing around the core at an angle to its longitudinal axis.

In testimony whereof I affix my signature.

HAMILTON C. CARPENTER.